Aug. 22, 1944.  C. F. PROUDMAN ET AL  2,356,179
DISPENSING CONTAINER
Filed Feb. 20, 1941    2 Sheets-Sheet 1

INVENTORS
CHESTER F. PROUDMAN
FRANKLYN C. WALTERS
BY *Mathias R. Kendall*
ATTORNEY

INVENTORS
CHESTER F. PROUDMAN
FRANKLYN C. WALTERS
BY
ATTORNEY

Patented Aug. 22, 1944

2,356,179

UNITED STATES PATENT OFFICE 2,356,179

DISPENSING CONTAINER

Chester F. Proudman and Franklyn C. Walters, New Canaan, Conn., assignors to The Walpro Products Corporation, New Canaan, Conn., a corporation of Connecticut Application February 20, 1941, Serial No. 379,868

5 Claims. (Cl. 31—20)

This invention relates to a dispensing container for loaf products, such as cheese and butter, and includes means to house said loaf in a sanitary manner, as well as providing means whereby the opening and closing of the container cover will automatically move the parent loaf into position for cutting and sever or cut a slice from said loaf, delivering same for ready handling. In a modification of the invention, means are provided for varying the thickness of the slices cut.

A principal object of the invention is to provide a container and a closure therefor, so arranged and inter-connected that the opening and closing of the closure will cut and deliver a slice of a loaf product stored within the container.

A further object of the invention is the provision of a belt conveyor, to support the loaf product in the container, so mounted as to be readily removed from, and replaced in, the container without the use of tools or the disconnecting of the operating parts.

A further object of the invention is the provision of means to operate the feed of the conveyor belt, so that an intermittent movement is obtained.

A further object of the invention is to provide means to time the movements of the conveyor belt, in relation to the movement of the container cover, so that the loaf on the conveyor will be stationary during the cutting operation.

A further object of the invention is to provide means to guide the cutting wire so that the loaf will be cut on the arc of a circle, to give a curvilinear slice of the product.

A further object of the invention is the novel combination, with other elements, in this application of the concept embodied in our prior application, Serial No. 294,062, filed September 9, 1939, and issued as Patent No. 2,312,456 on March 2, 1943, in particular comprising the position of the cutting plane in relation to the conveyor belt and the point of delivery therefrom.

A further object of the invention is to provide an adjustable stop to limit the movement of the operating pawl and the ratchet drive for the conveyor belt, so that a different amount of feed may be secured to obtain a variation in the thickness of the slices cut from the parent loaf.

To these and other ends the characteristic features and advantages of our improvement will more fully appear in the following description and the accompanying drawings in illustration thereof.

In the drawings, in which like reference numerals designate like parts:

Figure 1:
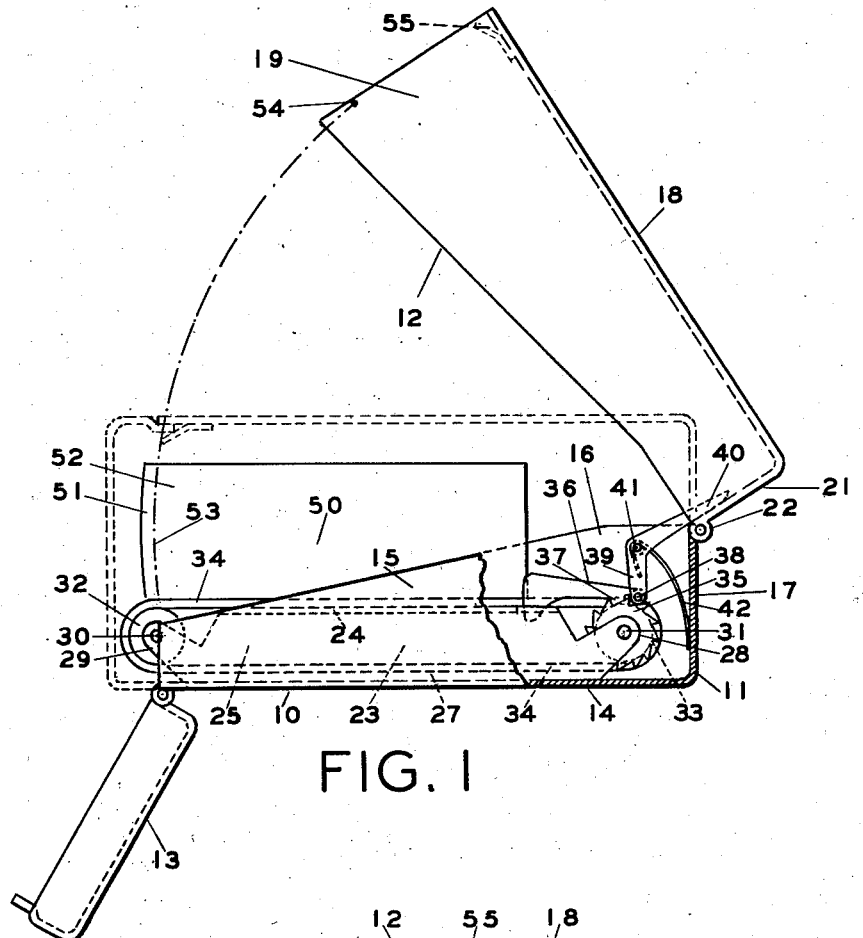
Fig. 1 is a side view, partly in section, showing the device with cover in open position.

In Fig. 1 reference numeral 10 designates the outer container of the device which includes the body 11, the hinged cover 12 and the end closure 13. The body 11 has a bottom 14, side walls 15 and 16 (see Fig. 2) and an end wall 17. The cover 12 has a top 18, side walls 19 and 20 (see Fig. 2) and an end wall 21, hinged at 22 to the end wall 17 of the body 11.

Positioned within the container 10 is the conveyor assembly 23 which may be removed as a unit from the container for the purpose of cleaning. The conveyor assembly consists of a table 24 supported by side walls 25 and 26 to which are attached the bottom 27. Oppositely disposed extensions 28 and 29 of the side walls 25 and 26 provide journal supports for the front shaft 30 and rear shaft 31, which shafts extend transversely of the conveyor.

Mounted on the shaft 30 is the front pulley 32 and fixed to the rear shaft 31 is the rear pulley 33. Extending around the pulleys 32 and 33 and over the top of the table 24 is the conveyor belt 34 which is driven by rotation of the rear pulley 33.

The loaf of product 50 is supported by the conveyor belt 34 and a slice 51 is cut from the front end 52 of the loaf along the arc 53 by means of the cutting wire 54 which is fixed in the cover 12 between the side walls 19 and 20.

The ratchet wheel 35 is fixed to the shaft 31. The pawl arm 36 is provided with the pawl tooth 37 to engage with the ratchet wheel 35. The table 24 being slotted longitudinally to provide clearance for the pawl arm 36 and permit the end of same to operate between the side walls 25 and 26 of the conveyor assembly 23. Pawl arm 36 is connected by the pin 38 to the bell crank 39 having the contact member 40. The pawl arm 36 has an enlarged end which acts as a weight urging the tooth 37 against the ratchet wheel 35. The bell crank 39 is fulcrumed on the shaft 41 which extends between, and is supported by, the side walls 15 and 16 of the container body 11. A spring 42 supported by the shaft 41 it attached to the crank 39 and engages the end wall 17 of the container body 11 to maintain rotative force on the bell crank 39.

Figure 3:
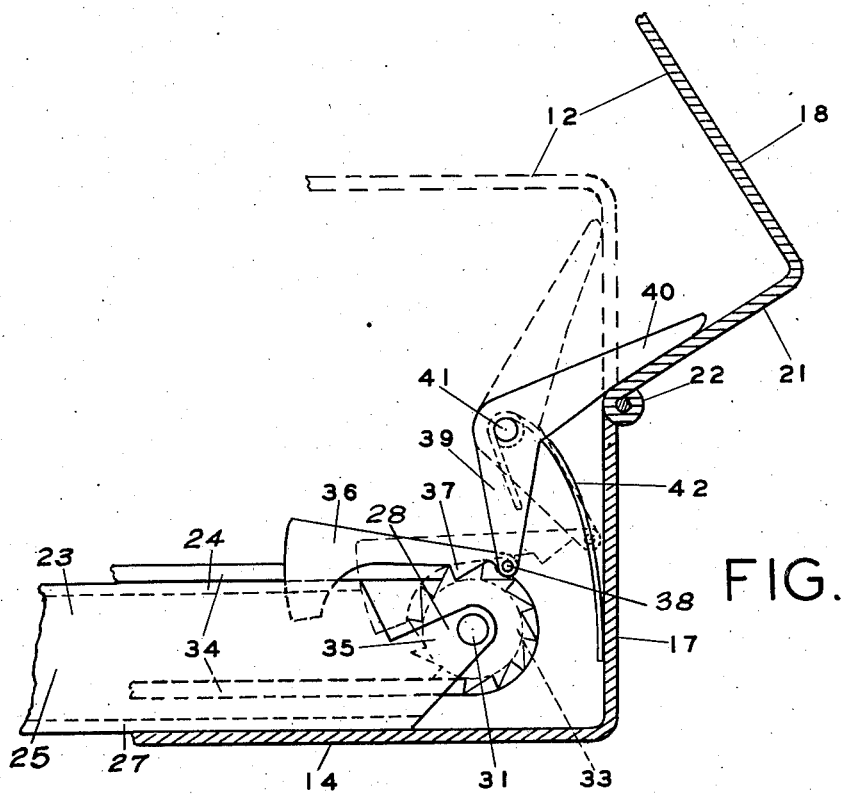
Fig. 3 is an enlarged fragmentary sectional view of the device of Fig. 1, showing the ratchet drive and associated parts and with the side walls of the container removed.

The operation of the device shown in Figs. 1 to 3 inclusive, is as follows:

With the cover 12 in closed position, the contact member 40 is at its highest point of movement and the pawl arm 36 is in retracted position, as shown by dotted lines in Fig. 3. When the cover 12 is raised to open the container, the contact member 40 descends, following the movement of the end wall of the cover, the spring 42 maintaining the member 40 in contact with the end wall 21. The downward movement of the member 40 permits the spring 42 to rotate the bell crank 39 and this causes a forward movement of the pawl arm 36. As shown in Fig. 3 (by dotted lines) when the cover 12 is in closed position there is a substantial clearance between the ratchet wheel 35 and the pawl tooth 37, and the first part of the movement in opening the cover is utilized to take up this clearance before the pawl tooth engages the ratchet wheel and thereby moves the conveyor forward.

The pawl clearance and free movement of the cover is an important feature, since it provides for the cutting wire 54 to rise above the loaf, housed in the container, before the conveyor and loaf move forward.

After the pawl tooth 37 engages the ratchet wheel 35, further opening movement of the cover allows the ratchet wheel 35 and the conveyor pulley 33 to be rotated by the spring 42, thus moving the conveyor belt and the loaf of product, supported thereby forward. The forward movement of the loaf 50 advances the loaf end 52 beyond the path 53 of the cutting wire 54, and thus positions the loaf for a slice 51 to be cut off.

It will be noted that the lower portion of the path 53 of the cutting wire 54 is substantially in the vertical plane through the axis of the pulley 32 and that the bottom of the slice 51 projects beyond this plane and, therefore, is free of the belt at the time of cutting. This is an important feature of our invention and is described and claimed in our above-mentioned co-pending application, Serial No. 294,062.

The downward motion of the cover to close the container causes the cutting wire 54 to sever or cut off the slice 51 from the end of the parent loaf and this slice, being unsupported, falls forward. If desired, a dish may be placed in position to receive one or more slices as cut.

The closing movement of the cover raises the member 40 of the bell crank 39, tensions the spring 42, and moves the pawl arm 36 into its retracted position.

The front end closure 13 may be raised when the cover 12 is down, and closes the end of the container, as well as locks the cover 12 by engaging in the catch 55.

Figure 2:
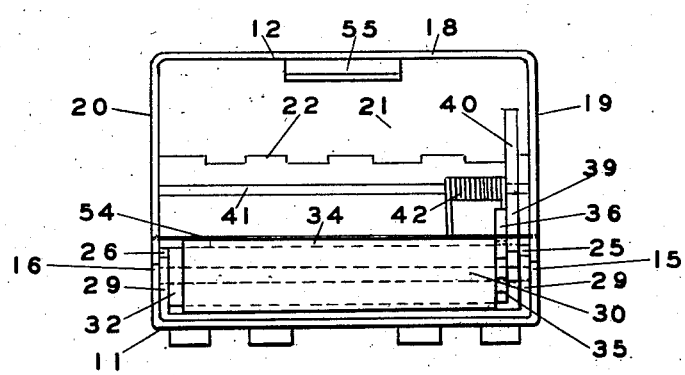
Fig. 2 is a front view of the device of Fig. 1, with end closure removed.

With the device shown in Figs. 1 to 3 inclusive, the circular pitch of the ratchet teeth and the relative diameter of the ratchet wheel to the pulley 33, will control the advance of the conveyor belt and the thickness of the slice cut with one stroke of the cover. Since the power portion of this stroke is only during the latter part of its motion (while the cutting wire is above the loaf) it is a simple matter to cut slices of any thickness, in multiples of the thinnest slice, by operating the cover repeatedly through the power part, or last part, of its stroke or movement, not closing the cover down to make a cut until the loaf has been advanced to obtain the desired thickness of slice.

This feature is of particular advantage in dispensing a print of butter, where one stroke may be set to give a unit quantity, for example, one tablespoonful, and the device will thus accurately measure quantities for use in recipes, etc.

It will be noted that the conveyor assembly of the conveyor table, side walls, pulleys and belt are separate from the container 10. The pawl arm 36 merely rides on the ratchet wheel 35. This construction permits of the removal from the container of the conveyor assembly as a unit, for cleaning or belt replacement, and the repositioning of same in the container, by simply lifting up the pawl arm 36 and sliding the ratchet wheel under same.

Figure 4:
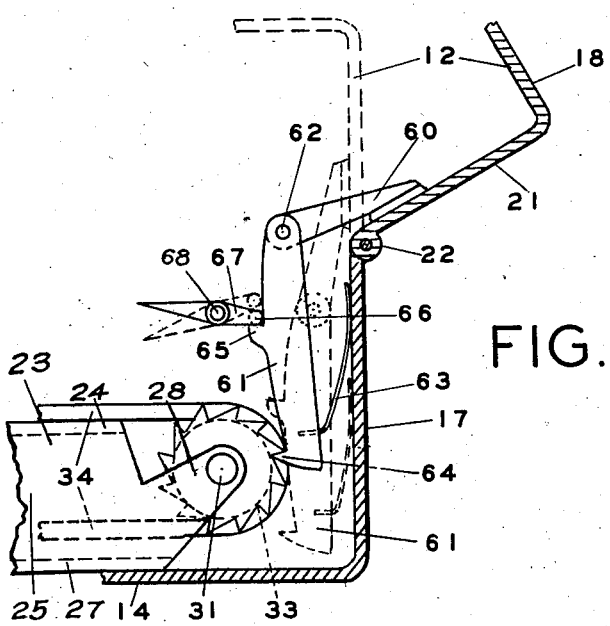
Fig. 4 is an enlarged fragmentary sectional view of a portion of a modification of the device shown in Fig. 1 and with the side walls of the container removed.

The modified drive shown in Fig. 4 may be used if desired. This comprises the conveyor belt 34, the pulley 33 and the ratchet wheel 35. The lever arm 60 is fixed to the end wall 21 of the cover 12 and carries the pawl arm 61 journalled on the pin 62. A flat spring 63 attached to the pawl arm 61 contacts the container wall 17 and serves to hold the pawl arm 61 against the ratchet wheel 35.

Opening and closing the cover 12 raises and lowers the pawl arm 61 and causes the pawl tooth 64 to engage with and move the ratchet wheel 35 and thus advance the conveyor belt 34, and the loaf supported thereby, as described above. Clearance between pawl tooth and ratchet wheel is provided as shown by the dotted lines in Fig. 4 so that the conveyor is only moved while the cutting wire is above the loaf of product.

As shown in Fig. 4, a shoulder 65 may be formed on the pawl arm 61 to engage with a pin 66 and thus limit the travel of the pawl arm. This pin 66 may be mounted on a swinging lever 67 to permit setting in different positions, as shown, and thus enable the pawl tooth 64 to advance the ratchet wheel 35 either one or two teeth at each stroke. The adjustment of pin 66, as shown, permits slices of either single or double thickness to be cut at each stroke of the cover. The lever 67 may be frictionally held in the desired position by mounting on a tight-fitting pivot 68 which in turn is fixed to the side wall 15 of the container. As explained above, a number of partial strokes of cover may be made to obtain slices of greater thickness.

We claim:

1. A dispensing container for loaf products comprising a receptacle body; a cover hinged to one wall of said body; a conveyor positioned within said container to support and feed a loaf of product; driving means for said conveyor comprising a ratchet wheel, a pawl, a bell crank provided with a member to follow the movement of said cover, and arranged to operate said pawl, and a spring to move said bell crank and advance said pawl and said conveyor, upon an opening movement of said cover; and a cutting wire fixed in said cover and arranged to cut a slice from said loaf during the closing of said cover.

2. A dispensing container for loaf products comprising a receptacle body; a cover hinged to one wall of said body; front and rear conveyor pulleys mounted in said container; a conveyor belt over said pulleys to support and feed a loaf of the product; ratchet drive means adapted to move said conveyor during a portion of the opening movement of said cover; and a cutting wire fixed in said cover and arranged to move in a path, which produced, would pass substantially through the axis of said front pulley, and cut a slice from said loaf during the closing of said cover.

3. A dispensing container for loaf products comprising a receptacle body; a cover hinged to one wall of said body; a conveyor positioned within said container to support and feed a loaf of product; driving means for said conveyor comprising a ratchet wheel, a pawl, and an arm fixed to said cover and operating said pawl; said driving means advancing said conveyor during the opening movement of said cover; and a cutting wire fixed in said cover and arranged to cut a slice from said loaf during the closing of said cover.

4. A dispensing container for loaf products comprising a receptacle body; a cover hinged to one wall of said body; a conveyor positioned within said container to support and feed a loaf of the product; ratchet drive means arranged to move said conveyor during the opening movement of said cover and comprising a ratchet wheel and a pawl, an adjustable stop to limit the motion of said pawl; and a cutting wire fixed in said cover and adapted to cut slices of varying thickness from said loaf, dependent upon the position of said stop, during the closing of said cover.

5. A container to cut and dispense slices from a loaf of product, comprising a receptacle body; front and rear conveyor pulleys mounted in said container; a conveyor belt extending around said pulleys to provide the sole support for said loaf, a hinge mounted rearward of said front pulley; a container cover supported by said hinge; means operated by motion of said cover to move said belt and feed said loaf forward; and a cutting wire fixed in said cover, maintained parallel to said belt and mounted to reciprocate substantially in a path which extends through the axis of said front pulley and intersects the point of curve of said belt, around said front pulley.

CHESTER F. PROUDMAN.
FRANKLYN C. WALTERS.